(12) United States Patent
Honey et al.

(10) Patent No.: US 9,750,189 B2
(45) Date of Patent: Sep. 5, 2017

(54) CROP FLOW ASSISTING DEVICE FOR HARVESTING HEADER

(71) Applicant: Honey Bee Manufacturing Ltd., Frontier (CA)

(72) Inventors: Gregory Honey, Frontier (CA); Glenn Honey, Frontier (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 26 days.

(21) Appl. No.: 14/292,790

(22) Filed: May 30, 2014

(65) Prior Publication Data
US 2015/0272002 A1    Oct. 1, 2015

(51) Int. Cl.
A01D 43/00    (2006.01)
A01D 57/02    (2006.01)
A01D 34/01    (2006.01)
A01D 57/20    (2006.01)
A01D 57/03    (2006.01)

(52) U.S. Cl.
CPC ............. *A01D 57/02* (2013.01); *A01D 34/01* (2013.01); *A01D 57/03* (2013.01); *A01D 57/20* (2013.01)

(58) Field of Classification Search
CPC ...... A01D 41/14; A01D 57/20; A01D 61/002; A01D 57/00; A01D 57/22
USPC .......................................... 56/153, 208, 181
See application file for complete search history.

(56) References Cited

U.S. PATENT DOCUMENTS

| 12,750 | A | | 4/1855 | Chatfield | |
| 524,215 | A | | 8/1894 | Quigley | |
| 2,047,274 | A | * | 7/1936 | Korsmo | A01D 57/04 56/220 |
| 2,413,072 | A | | 12/1946 | Sage | |
| 2,694,894 | A | | 11/1954 | Linscheld | |
| 3,468,109 | A | | 9/1969 | Reimer | |
| 3,472,008 | A | | 10/1969 | Hurlburt | |
| 3,474,606 | A | * | 10/1969 | Rohweder | A01D 41/14 56/15.6 |
| 3,550,366 | A | | 12/1970 | Gibson | |
| 3,561,198 | A | * | 2/1971 | Herbsthofer | A01D 41/148 56/11.9 |

(Continued)

FOREIGN PATENT DOCUMENTS

| CA | 1003310 | 1/1977 |
| CA | 1040438 | 10/1978 |

(Continued)

*Primary Examiner* — Árpád Fábián-Kováacs

(57) ABSTRACT

A harvesting header includes at least one draper belt system including a conveying surface operable to carry cut crop material in a conveying direction generally transverse to a direction of travel of the harvesting header in operation to a header discharge. The header includes a crop reel rotatable about a crop reel axis, said axis generally parallel with the conveying direction, said crop reel operable to, when rotated in operation, draw crop material onto the conveying surface and at least one crop flow assistance device having a crop flow assistance surface that extends into a volume above the conveying surface, said volume defined by the conveying surface and projected perpendicular to said conveying surface, said crop flow assistance surface operable to roll crop material onto the conveying surface while the crop material is carried to the header discharge in operation.

4 Claims, 10 Drawing Sheets

Matted Crop Flow

(56) References Cited

U.S. PATENT DOCUMENTS

| | | | |
|---|---|---|---|
| 3,771,299 A | 11/1973 | Gradwohl et al. | |
| 3,927,512 A | 12/1975 | Molzahn | |
| 3,945,180 A | 3/1976 | Sinclair | |
| 4,000,600 A * | 1/1977 | Butler | A01D 41/141 |
| | | | 56/220 |
| 4,038,809 A * | 8/1977 | Arnould | A01D 57/20 |
| | | | 56/124 |
| 4,038,810 A | 8/1977 | Williams et al. | |
| 4,067,177 A | 1/1978 | Tout | |
| 4,120,137 A | 10/1978 | Schoeneberger et al. | |
| 4,127,981 A | 12/1978 | Parrish et al. | |
| 4,137,696 A | 2/1979 | Webb | |
| 4,156,340 A | 5/1979 | Colgan et al. | |
| 4,174,602 A | 11/1979 | Webb et al. | |
| 4,177,625 A | 12/1979 | Knight et al. | |
| 4,187,664 A | 2/1980 | Meek et al. | |
| 4,202,154 A | 5/1980 | Waldrop et al. | |
| 4,255,920 A * | 3/1981 | Janzen | A01D 45/003 |
| | | | 56/126 |
| 4,270,338 A | 6/1981 | Halls | |
| 4,346,909 A | 8/1982 | Hundeby | |
| 4,353,201 A | 10/1982 | Pierce et al. | |
| 4,435,948 A | 3/1984 | Jennings | |
| 4,512,140 A | 4/1985 | Blakeslee | |
| 4,519,190 A | 5/1985 | Blakeslee | |
| 4,522,018 A | 6/1985 | Blakeslee | |
| 4,541,229 A | 9/1985 | Elijah | |
| 4,573,124 A | 2/1986 | Seiferling | |
| 4,573,309 A | 3/1986 | Patterson | |
| 4,612,757 A | 9/1986 | Halls et al. | |
| 4,637,201 A | 1/1987 | Pruitt et al. | |
| 4,641,490 A | 2/1987 | Wynn et al. | |
| 4,660,361 A | 4/1987 | Remillard et al. | |
| 4,662,161 A | 5/1987 | Patterson | |
| 4,663,921 A * | 5/1987 | Hagstrom | A01D 41/14 |
| | | | 460/16 |
| 4,751,809 A | 6/1988 | Fox et al. | |
| 4,776,155 A | 10/1988 | Fox et al. | |
| 4,833,869 A | 5/1989 | Klein | |
| 4,909,026 A | 3/1990 | Molzahn et al. | |
| 4,910,946 A * | 3/1990 | Underwood | A01D 41/148 |
| | | | 56/14.4 |
| 4,936,082 A | 6/1990 | Majkrzak | |
| 4,944,141 A | 7/1990 | Orlando et al. | |
| 4,956,966 A | 9/1990 | Patterson | |
| 5,005,343 A | 4/1991 | Patterson | |
| 5,007,235 A | 4/1991 | Nickel et al. | |
| 5,086,613 A | 2/1992 | Fox et al. | |
| 5,155,983 A | 10/1992 | Sheehan et al. | |
| 5,157,905 A | 10/1992 | Talbot et al. | |
| 5,243,810 A | 9/1993 | Fox et al. | |
| 5,261,290 A | 11/1993 | Ramsay et al. | |
| 5,359,839 A | 11/1994 | Parsons et al. | |
| 5,435,239 A | 7/1995 | Talbot | |
| 5,459,986 A | 10/1995 | Talbot et al. | |
| 5,473,872 A | 12/1995 | Fox et al. | |
| 5,535,577 A | 7/1996 | Chmielewski et al. | |
| 5,595,053 A | 1/1997 | Jasper et al. | |
| RE35,543 E | 7/1997 | Patterson | |
| 5,678,398 A | 10/1997 | Fox et al. | |
| 5,681,117 A | 10/1997 | Wellman et al. | |
| 5,704,200 A | 1/1998 | Chmielewski, Jr. et al. | |
| 5,768,870 A | 6/1998 | Talbot et al. | |
| 5,791,128 A | 8/1998 | Rogalsky | |
| 5,927,606 A | 7/1999 | Patterson | |
| 5,950,406 A * | 9/1999 | Koegel | A01D 82/00 |
| | | | 56/14.5 |
| 5,992,759 A | 11/1999 | Patterson | |
| 6,029,429 A | 2/2000 | Fox et al. | |
| 6,044,636 A | 4/2000 | Minnaert | |
| 6,079,194 A | 6/2000 | Waldrop | |
| 6,170,244 B1 | 1/2001 | Coers et al. | |
| 6,195,972 B1 | 3/2001 | Talbot et al. | |
| 6,199,358 B1 | 3/2001 | Majkrzak | |
| 6,282,876 B1 | 9/2001 | Patterson | |
| 6,324,823 B1 | 12/2001 | Remillard | |
| 6,351,931 B1 | 3/2002 | Shearer | |
| 6,381,937 B1 * | 5/2002 | Nelson | A01D 57/22 |
| | | | 56/127 |
| 6,397,573 B2 | 6/2002 | Majkrzak | |
| 6,442,918 B1 | 9/2002 | Fox | |
| 6,453,655 B2 | 9/2002 | Ferraris | |
| 6,502,379 B1 | 1/2003 | Snider | |
| 6,519,923 B1 | 2/2003 | Cooksey et al. | |
| 6,530,202 B1 | 3/2003 | Guyer | |
| 6,543,211 B1 | 4/2003 | Talbot | |
| 6,591,598 B2 | 7/2003 | Remillard et al. | |
| 6,675,568 B2 | 1/2004 | Patterson et al. | |
| 6,698,175 B1 | 3/2004 | Schumacher et al. | |
| 6,708,475 B2 | 3/2004 | Guyer | |
| 6,817,166 B2 | 11/2004 | Dunn | |
| 6,843,045 B2 | 1/2005 | Bickel | |
| 6,854,251 B2 | 2/2005 | Snider | |
| 6,865,871 B2 | 3/2005 | Patterson et al. | |
| 6,889,492 B1 | 5/2005 | Polk et al. | |
| 6,962,040 B2 | 11/2005 | Talbot | |
| 7,077,220 B2 | 7/2006 | Dunn et al. | |
| 7,131,253 B2 | 11/2006 | Remillard et al. | |
| 7,159,687 B2 | 1/2007 | Dunn et al. | |
| 7,188,461 B2 | 3/2007 | Fox et al. | |
| 7,197,865 B1 | 4/2007 | Enns et al. | |
| 7,306,062 B2 | 12/2007 | Dunn | |
| 7,306,252 B2 | 12/2007 | Barnett | |
| 7,308,947 B2 | 12/2007 | Barnett | |
| 7,322,175 B2 | 1/2008 | Ferre et al. | |
| 7,328,565 B2 | 2/2008 | Snider et al. | |
| 7,340,876 B1 | 3/2008 | Barnett | |
| 7,347,277 B2 | 3/2008 | Enns et al. | |
| 7,356,982 B2 | 4/2008 | Barnett | |
| 7,364,181 B2 | 4/2008 | Patterson | |
| 7,373,769 B2 | 5/2008 | Talbot et al. | |
| 7,392,124 B2 | 6/2008 | MacGregor et al. | |
| 7,392,646 B2 | 7/2008 | Patterson | |
| 7,438,305 B2 | 10/2008 | Schulz | |
| 7,444,798 B2 | 11/2008 | Patterson et al. | |
| 7,454,888 B2 | 11/2008 | Barnett | |
| 7,461,498 B1 | 12/2008 | Barnett | |
| 7,467,505 B2 | 12/2008 | MacGregor | |
| 7,472,533 B2 | 1/2009 | Talbot et al. | |
| 7,484,349 B2 | 2/2009 | Talbot et al. | |
| 7,497,069 B2 | 3/2009 | Enns et al. | |
| 7,520,117 B2 * | 4/2009 | Rieck | A01D 41/12 |
| | | | 56/62 |
| 7,587,885 B2 * | 9/2009 | Tippery | A01D 57/20 |
| | | | 56/14.5 |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,849,952 B2 | 12/2010 | MacGregor et al. | |
| 7,856,801 B2 | 12/2010 | Remillard | |
| 7,918,076 B2 | 4/2011 | Talbot | |
| 7,958,706 B2 | 6/2011 | Remillard et al. | |
| 8,006,469 B2 | 8/2011 | Barnett | |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,061,114 B2 * | 11/2011 | Mossman | A01D 41/14 |
| | | | 56/119 |
| 8,069,640 B2 | 12/2011 | Barnett et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 | 10/2012 | Cormier et al. | |
| 8,307,620 B1 | 11/2012 | Barnett et al. | |

(56) References Cited

U.S. PATENT DOCUMENTS

| | | | |
|---|---|---|---|
| 8,333,057 | B2 | 12/2012 | Schroeder et al. |
| 8,341,927 | B2 | 1/2013 | Barnett |
| 8,387,351 | B2 | 3/2013 | Guyer |
| 8,402,728 | B2 | 3/2013 | Kidd |
| 8,408,567 | B2 | 4/2013 | Bergman et al. |
| 8,434,290 | B2 | 5/2013 | Barnett et al. |
| 8,468,789 | B2 | 6/2013 | Barnett et al. |
| 8,484,938 | B2 | 7/2013 | Cormier et al. |
| 8,484,939 | B1 | 7/2013 | Cormier et al. |
| 8,511,050 | B1 | 8/2013 | Cormier et al. |
| 8,590,284 | B2 | 11/2013 | Rayfield |
| 8,756,904 | B2 * | 6/2014 | Schrattenecker ...... A01D 41/14 56/14.9 |
| 8,881,495 | B2 * | 11/2014 | Lohrentz ................ A01D 47/00 56/10.2 E |
| 2007/0193243 | A1 * | 8/2007 | Schmidt ................. A01D 41/14 56/181 |
| 2008/0295474 | A1 * | 12/2008 | Tippery ................. A01D 57/20 56/14.5 |
| 2010/0326035 | A1 * | 12/2010 | Schrattenecker ...... A01D 41/14 56/51 |
| 2012/0047866 | A1 * | 3/2012 | Fuechtling ........... A01D 61/002 56/153 |
| 2012/0251653 | A1 | 10/2012 | Mathy, Jr. et al. |
| 2012/0260870 | A1 | 10/2012 | Wahl et al. |
| 2013/0036860 | A1 | 2/2013 | Corniani |
| 2014/0001726 | A1 | 1/2014 | Statz |
| 2014/0033940 | A1 | 2/2014 | Simpson et al. |
| 2014/0150601 | A1 | 6/2014 | McGrath |

FOREIGN PATENT DOCUMENTS

| | | | | |
|---|---|---|---|---|
| CA | 1043577 | 12/1978 | | |
| CA | 2180627 | 1/1980 | | |
| CA | 1086508 | 9/1980 | | |
| CA | 1087402 | 10/1980 | | |
| CA | 1185438 | 4/1985 | | |
| CA | 1197694 | 12/1985 | | |
| CA | 1318135 | 5/1993 | | |
| CA | 2100204 | 1/1995 | | |
| CA | 2126909 | 1/1995 | | |
| CA | 2138939 | 6/1996 | | |
| CA | 2165735 | 6/1997 | | |
| CA | 2180625 | 1/1998 | | |
| CA | 2180626 | 1/1998 | | |
| CA | 2211363 | 1/1998 | | |
| CA | 2198672 | 8/1998 | | |
| CA | 2226200 | 11/1998 | | |
| CA | 2229152 | 8/1999 | | |
| CA | 2245213 | 2/2000 | | |
| CA | 2280681 | 2/2000 | | |
| CA | 2184278 | 8/2000 | | |
| CA | 2289164 | 10/2000 | | |
| CA | 2289171 | 10/2000 | | |
| CA | 2284432 | 4/2001 | | |
| CA | 2284436 | 4/2001 | | |
| CA | 2320379 | 5/2001 | | |
| CA | 2307176 | 10/2001 | | |
| CA | 2311019 | 12/2001 | | |
| CA | 2320524 | 3/2002 | | |
| CA | 2357825 | 9/2002 | | |
| CA | 2380557 | 10/2002 | | |
| CA | 2387898 | 12/2002 | | |
| CA | 2358883 | 4/2003 | | |
| CA | 2359598 | 4/2003 | | |
| CA | 2370891 | 4/2003 | | |
| CA | 2399234 | 6/2003 | | |
| CA | 2389513 | 12/2003 | | |
| CA | 2406416 | 4/2004 | | |
| CA | 2406419 | 4/2004 | | |
| CA | 2427755 | 11/2004 | | |
| CA | 2461790 | 11/2004 | | |
| CA | 2467595 | 12/2004 | | |
| CA | 2434981 | 1/2005 | | |
| CA | 2510883 | 12/2005 | | |
| CA | 2513037 | 2/2006 | | |
| CA | 2341283 | 3/2006 | | |
| CA | 2494395 | 6/2006 | | |
| CA | 2494034 | 7/2006 | | |
| CA | 2505431 | 9/2006 | | |
| CA | 2505458 | 9/2006 | | |
| CA | 2531189 | 9/2006 | | |
| CA | 2513605 | 1/2007 | | |
| CA | 2513614 | 1/2007 | | |
| CA | 2528731 | 1/2007 | | |
| CA | 2743336 | 1/2007 | | |
| CA | 2521187 | 3/2007 | | |
| CA | 2522387 | 4/2007 | | |
| CA | 2524151 | 4/2007 | | |
| CA | 2525904 | 5/2007 | | |
| CA | 2527797 | 5/2007 | | |
| CA | 2534200 | 6/2007 | | |
| CA | 2538020 | 8/2007 | | |
| CA | 2554689 | 1/2008 | | |
| CA | 2596403 | 2/2008 | | |
| CA | 2559217 | 3/2008 | | |
| CA | 2559353 | 3/2008 | | |
| CA | 2561463 | 3/2008 | | |
| CA | 2609744 | 5/2008 | | |
| CA | 2627320 | 9/2008 | | |
| CA | 2626486 | 2/2009 | | |
| CA | 2639032 | 3/2009 | | |
| CA | 2783567 | 3/2009 | | |
| CA | 2587107 | 7/2009 | | |
| CA | 2627053 | 9/2009 | | |
| CA | 2578907 | 4/2010 | | |
| CA | 2671880 | 4/2010 | | |
| CA | 2564777 | 8/2010 | | |
| CA | 2695689 | 9/2010 | | |
| CA | 2665580 | 11/2010 | | |
| CA | 2665589 | 11/2010 | | |
| CA | 2706704 | 1/2011 | | |
| CA | 2706705 | 1/2011 | | |
| CA | 2706706 | 1/2011 | | |
| CA | 2706707 | 1/2011 | | |
| CA | 2775891 | 1/2011 | | |
| CA | 2783670 | 1/2011 | | |
| CA | 2713636 | 2/2011 | | |
| CA | 2596627 | 4/2011 | | |
| CA | 2686017 | 5/2011 | | |
| CA | 2721118 | 5/2011 | | |
| CA | 2739632 | 11/2011 | | |
| CA | 2708744 | 12/2011 | | |
| CA | 2745105 | 12/2011 | | |
| CA | 2538489 | 1/2012 | | |
| CA | 2707624 | 1/2012 | | |
| CA | 2709336 | 1/2012 | | |
| CA | 2710676 | 2/2012 | | |
| CA | 2734475 | 5/2012 | | |
| CA | 2766611 | 7/2012 | | |
| CA | 2744070 | 12/2012 | | |
| CA | 2802894 | 1/2013 | | |
| CA | 2796109 | 5/2013 | | |
| CA | 2796120 | 5/2013 | | |
| CA | 2796131 | 5/2013 | | |
| CA | 2796134 | 5/2013 | | |
| CA | 2796177 | 5/2013 | | |
| CA | 2796165 | 6/2013 | | |
| CA | 2802958 | 7/2013 | | |
| CA | 2802963 | 7/2013 | | |
| CA | 2802972 | 7/2013 | | |
| CA | 2802975 | 7/2013 | | |
| CA | 2803470 | 7/2013 | | |
| CA | 2814924 | 10/2013 | | |
| CA | 2815395 | 10/2013 | | |
| CA | 2815408 | 10/2013 | | |
| CA | 2815421 | 10/2013 | | |
| CA | 2815427 | 10/2013 | | |
| DE | 102010052816 | * | 5/2012 | ............ A01D 41/12 |
| EP | 1935226 | 6/2008 | | |
| WO | 2012/166629 | 12/2012 | | |

* cited by examiner

CROP FLOW ASSISTING DEVICE FOR HARVESTING HEADER

This invention is in the field of agricultural equipment, and more specifically in the area of crop cutting and harvesting equipment and headers.

BACKGROUND

It is known in the field of crop harvesting equipment to employ harvesting headers to cut crops for various purposes, such as feeding a combine harvester or swathing crop material.

At the front of a combine or swather is the portion referred to as the header. Headers are generally designed to be detachable and some are designed to be optimized for harvesting particular crops. A typical header is equipped with a cutter bar [comprising a reciprocating knife in most cases. There is typically a conveyor deck or surface behind the cutter bar onto which cut crop material will fall, and a rear wall of the header which extends up from the rear of the crop catching surface from a joint. Typically a rotating reel with metal or plastic bats carrying fingers is used to sweep the standing crop towards the cutter bar as the header and attached harvesting machine is moved down the field. The reel bats also assist in ensuring that the cut crop falls into the conveyor system of the header once it has been cut.

Some harvesting headers include an auger conFigured to feed cut material laterally from the outside of the header towards the center where it is then directed to a windrow discharge chute, or into the throat of the combine harvester. More recent harvesting headers replace the auger for the feed of material to the center of the header with a conveyor system, also termed a draper conveyor system. Unlike a rotating auger, drapers typically comprise a fabric or rubber apron acting much like a conveyor belt to move material from the outside of the header laterally towards the center of the conveyor. The draper approach carries the crop material more gently, and there is less opportunity for jamming or plugging particularly in the cutting of heavy crop material. Draper headers typically allow faster feeding than augers, leading to higher throughputs and lower power requirements to operate.

While draper headers are generally very efficient for use with cereal grain crops, they, along with auger type headers suffer from problems when used in harvesting crops such as peas, soybeans and the like. These crops, given their dense or tangling propensity tend to be more difficult to efficiently handle in header operation since they can more easily ball up and bind in the header table area, or even ball up and push up over the top of the rear wall of the header throwing crop material back out of the operating area and generally speaking impacting the operating efficiency of the unit.

If it were possible to, either in an OEM or retrofit context, provide a means to minimize plugging of this type and maximize throughput of the header in these types of crops, it would be desirable. In some prior art harvester or cutting systems, a solution has been to include a second conveyor system for example a second draper oriented more vertically along the rear wall of the header, in order to assist in moving material from the back of the conveyor deck into the feed chute leading to the threshing portion. Clearly, this is not a particularly desirable solution as it drastically increases the cost of the harvesting header. In addition, a harvesting header with a second conveyor is mechanically more complicated, requires more power to operate, and with more moving parts provides greater opportunity for breakdown, failure as well as increased maintenance. It is also virtually impossible to modify pre-existing equipment with an additional conveyor, and thus this solution requires a farmer to purchase a completely new header to deal with this issue in a retrofit context, which is not an economically attractive solution.

As a result, what is needed is a harvesting header that is conFigured to avoid the limitations of prior art headers and provide for smooth feed of cut crop from the conveyor deck into the feed chute leading to the threshing stage or swather discharge, as well as to prevent clogging of the draper or auger conveyor that moves material laterally towards the discharge of the header.

SUMMARY OF THE INVENTION

The present invention comprises a crop flow assistance device which reduces the resistance to the proper flow of cut crop material along the conveyor deck of the header to the windrow or harvester discharge. In particular, the crop flow assistance device of the present invention could be configured such that it provides a concave surface which will be encountered by crop material which is traveling to and up the rear of the conveyor deck and the rear wall of the header, so that the generally concave crop flow assistance surface of the crop flow assistance device will effectively aid in guiding the cut crop material away from overflow over the top edge of the rear wall as it is moved along the conveyor deck by the transverse conveyor. By providing a concave crop flow assistance surface to guide crop material within the crop material transport area of the header, the invention reduces the likelihood of crop material jamming against the back of the header and either clogging as it is carried laterally to the discharge or clogging the feed chute discharging from the header, or flowing over the top edge of the rear wall of the header resulting in crop material which has been cut by the header being thrown over the back of the wall.

The crop flow assistance device might have utility in many different types of crops being cut. Bushy crops such as canola or mustard, or matted crops such as peas and lentils, are more difficult to handle in a conventional harvesting header and the use of a header with this crop flow assistance device and surface is contemplated to have utility in the most efficient manufacture of a harvesting header or retrofit of a harvesting header with the capability to efficiently carry the harvested or cut crop material to the discharge of the header. Anything that can be done to smooth and expedite the path of the crop material between the cutter bar and a windrow or harvester discharge will minimize the stress on the crop material and attendant shelling or other destructive influence on the crop material, as well as allowing for maximum ground speed of the harvesting header itself to speed up the harvest since if the smooth travel of the crop material across the conveyor deck to the discharge can be maximized, the draper or other transverse conveyor can be sped up to carry more material and the ground speed of the entire unit increased subject to the capacity of the remainder of the machine.

In a first incarnation, the invention is a harvesting header with a crop flow assistance surface, for attachment to a harvesting power unit, the header comprising at least one conveyer deck which has a forward edge and a rearward edge which will be oriented transverse to the direction of travel of the power unit. There is a cutting means along the forward edge of the conveyor deck for the cutting of crop material which is encountered during the driving of the header forward through a standing crop, following which cutting that crop material is anticipated to be deposited onto the at least one conveyor deck.

In addition to the deck and a cutting blade along the front edge thereof, there is also a rear wall of the header which has a top edge and a bottom edge. The bottom edge of the rear wall is attached to the rearward edge of the conveyor deck in a header joint, and extends upwards therefrom. The area which is defined by the conveyor deck and the rear wall, through which crop material moves across the conveyor deck to a discharge, is called a crop material transport area. The harvesting header would also comprise a crop reel which is mounted in relation to the conveyor deck and cutting means, to draw crop material into the cutting means and onto the conveyor deck in operation.

There is also at least one transverse conveyor mounted to the header, which is oriented to carry cut crop material across the conveyor deck to a header discharge. The header discharge is typically through the rear wall either into the throat of a harvesting unit or onto the ground into a windrow. The transverse conveyor is typically mounted to the header with a rearward edge in proximity to the header joint, along the rear of the conveyor deck and its joinder to the rear wall, and a top surface which is also in operating proximity to the near wall. The transverse conveyor then extends into the crop material transport area. There are numerous types of devices which have been used in many different harvesting headers as transverse conveyors. The primary items which are contemplated are either a transverse belt conveyor or draper, or a transverse auger.

The next element of the harvesting header of the present invention is at least one crop flow assistance device which corresponds to the at least one conveyor deck. The crop flow assistance device comprises a top body member which has a forward edge and a rearward edge. The rearward edge of the top body member is attached to the rear wall of the harvesting header in proximity to the top edge of the rear wall, and the forward edge of that top body member then extends forward from the rear wall into the crop material transport area, towards but not engaging the crop reel. Effectively, the top body member comprises a partial cover of sorts on the crop material transport area.

The second aspect of the crop flow assistance device is a generally concave crop guidance plate which has a top edge and a bottom edge. The top edge of the crop guidance plate is attached along the forward edge of the top body member and the bottom edge of the crop guidance plate is attached to the rear wall of the header in proximity to the top edge of the at least one transverse conveyor. Effectively the crop flow assistance device provides a smooth crop flow assistance surface to roll crop material moving into or up the rear wall of the header back into the crop material transport area while it is carried across the conveyor deck by the at least one transverse conveyor.

There are multiple types of harvesting headers in respect of which this embodiment could be used and manufactured. The number of conveyor decks could be one, for example when a header discharge is located at one of the transverse ends of the conveyor deck. In other circumstances, the header might actually comprise two conveyor decks and two transverse conveyors converging at a central discharge. Either such option is contemplated within the scope of the present invention. In the case of a harvesting header with two conveyor decks, they might share a single rear wall or there might be two rear walls which were connected by a frame to define a header discharge opening.

As outlined above, the transverse conveyor which would be used in the harvesting conveyor of the present invention could be a draper belt system or an auger.

The crop flow assistance device as a whole would provide a concave shield for the guidance of crop material along substantially the entire top edge of the rear wall of the harvesting header. This could be accomplished using either a single crop flow assistance device which was of sufficient length to be mounted to the rear wall of the header and cover the entire area, or in other embodiments, and particularly where it was desired to manufacture the crop flow assistance device itself for use in a retrofit capacity on varying types of headers, the crop flow assistance surface could be made up by a number of crop flow assistance devices manufactured to be of a smaller standardized size and they could be mounted adjacent to each other, side by side, in a number of more than one, to provide in totality the effective length of a single crop flow assistance device and surface of the selected length of the conveyor deck.

The crop flow assistance device might have a rear surface which provided a rear face which would engage the rear wall of the header and provide additional strength to the crop flow assistance device. That rear surface could extend from the rearward edge of the top body member to the bottom edge of the crop guidance plate. In other embodiments, the crop flow assistance device may not have this rear surface—both such approaches are contemplated within the scope of the present invention. It is also contemplated purely from a manufacturing perspective that the crop flow assistance device, either in a single approach or in the shorter modular implementation, could be manufactured from a single piece of bent sheet material or even injected or otherwise molded in a unitary fashion, or alternatively could be manufactured from multiple pieces of material yielding the complete design of the crop flow assistance device.

The crop flow assistance device would be mounted to the remainder of the harvesting header either by welding or by removeable hardware such as bolts, clips or the like.

The crop flow assistance device itself also comprises the present invention. There is disclosed a crop flow assistance device for attachment to a harvesting header. The typical header comprises at least one conveyor deck having a forward edge and a rearward edge which will be oriented transverse the direction of travel of the power unit, cutting means along the forward edge of the at least one conveyor deck for the cutting of crop material onto the at least one conveyor deck, a rear wall having a top edge and a bottom edge, the bottom edge thereof being attached to the rearward edge of the conveyor deck and a header joined and extending upwards therefrom and the area defined by the at least one conveyor deck and the rear wall comprising a crop material transport area, as well as at least one crop reel mounted in relation to the conveyor deck and cutting means to draw crop material into the cutting means and onto the conveyor deck when in operation. The header would also include at least one transverse conveyor to carry cut crop material across the conveyor deck to a header discharge through the rear wall, attached to the header with a rearward edge in proximity to the header joint, a top edge in operating proximity to the rear wall and extending into the crop material transport area. The crop flow assistance device itself then comprises a top body member having a forward edge and a rearward edge, the rearward edge thereof attachable to the rear wall of the header in proximity to the top edge thereof, and the forward edge thereof extending into the crop material transport area towards but not engaging the crop reel of the harvesting header in question. A second element of the crop flow assistance device in addition to the top body member is a generally concave crop guidance plate which has a top edge and a bottom edge, the top edge of the crop guidance plate will be attached along the forward edge of the top body member and the bottom edge of the top guidance plate being attachable to the rear wall of the header in proximity to the top edge of at least one transverse conveyor. The crop flow assistance device when attached to the header provides a smooth circular deflection path for crop material moving into or up the rear wall of the header, back into the crop material transport area while it is carried across the conveyor deck by the at least one transverse conveyor.

The crop flow assistance device is of a selected length to singularly shield the entire desired top edge of the rear wall of a header, or in other embodiments could be shorter and assembled in parallel proximity to each other with overlapping or proximate edges to in a modular fashion provide a crop flow assistance device which in its totality is of the selected length to singularly shield the entire desired top edge of the rear wall of the header.

The crop flow assistance device might also include a rear facing wall extending from the rearward edge of the top body to the bottom edge of the top guidance plate, which defined a rearward face of the crop flow assistance device which would engage the rear wall of the header.

The crop flow assistance device of the present invention eliminates these issues as it is a passive design that does not require any power source. The shape of the crop flow assistance device is designed to guide or hold the crop material once cut onto and along the lateral or transverse drapers are conveyor so that they can perform their intended role of moving the crop to the middle and the discharge. There are no adjustments which are required to make this happen and the design functions automatically when engaged by the crop which has no impact on normal crop material flow as well.

Various modifications could be made to the overall concept of the invention including changing the curve or the shape of the crop guidance plate—the crop guidance plate in terms of being approximately concave might have an arcuate shape or might even have an angular bend to it but still accomplish the same objective. All such modifications are contemplated within the scope hereof and are intended to be within the scope of the present invention.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

Figure 1A:
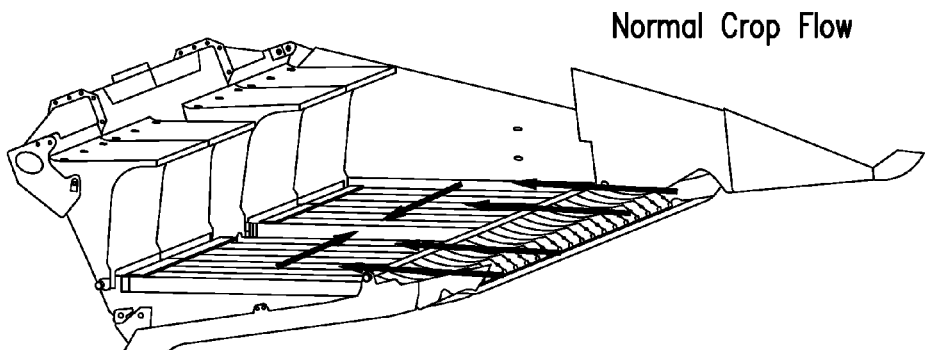
FIG. 1A is a partial perspective view of a harvesting header in accordance with the present invention, demonstrating the handling of normal crop material.

There have been multiple attempts made in the prior art to come up with modifications for harvesting headers to allow for the proper flow and draper engagement of both bushy and matted crop material. The flow of these two types of crops differ from "normal" crop flow, in that they do not naturally lay on the draper conveyor to be carried to the center deck or discharge. Rather they tend to ride on top of the draper or carry over the back wall of the header and to resist the desired flow path to the center deck or discharge.

One of the traditional solutions for these problems has been to fit a smaller diameter auger to the rear wall of the header about two thirds of the way up to the top edge, below a main frame tube. These cross augers "screw" the floating crop material towards the middle, regardless of draper engagement. This generally speaking works but it interferes with crop following as it causes the crop to become entangled in that cross auger mechanism which in turn results in required operator intervention to clear the entanglement. This approach also comprises significant additional manufacturing cost.

As well, the cross augers are typically hydraulically powered and since the supply of hydraulic powers limited on header, the more hydraulic devices that are installed will reduce the hydraulic power available for other circuits. Reduction in overall available hydraulic power as well as additional heat generation are two additional factors which combined to reduce the overall power on the conveyor deck and results in reduced performance and cascading power issues.

The crop flow assistance device of the present invention eliminates these issues as it is a passive design that does not require any power source. The shape of the crop flow assistance device is designed to guide or hold the crop material once cut onto and along the lateral or transverse drapers are conveyor so that they can perform their intended role of moving the crop to the middle and the discharge. There are no adjustments which are required to make this happen and the design functions automatically when engaged by the crop which has no impact on normal crop material flow as well.

Crop Material Types:

The way that the harvesting header itself typically operates is that a header, with a reel or other similar crop gathering apparatus gathers crop material into a cutting blade and then deposits it onto a conveyor deck, which is fitted either with a transverse auger or a draper conveyor belt which in turn transports the crop material for deposit into a windrow or into the throat of a harvesting machine.

As it becomes desirable to increase the size of header units and the field speed at which they are operated one of the issues that arises is the circumstance at which crop material which is deposited on the conveyor deck balls up or otherwise travels up the rear wall of the header, within the area defined as the crop material transport area and can potentially slide up over the back of the rear wall and be thrown over the back, or otherwise ball up and be problematic in the operation of the header. This is the problem which it was desired to address in development of the present invention.

Figure 1B:
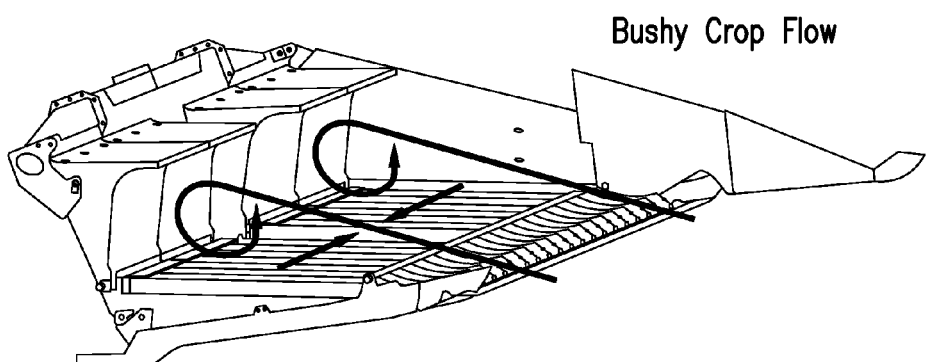
FIG. 1B is a partial perspective view of a harvesting header in accordance with the present invention, demonstrating the handling of bushy crop material.
Figure 1C:
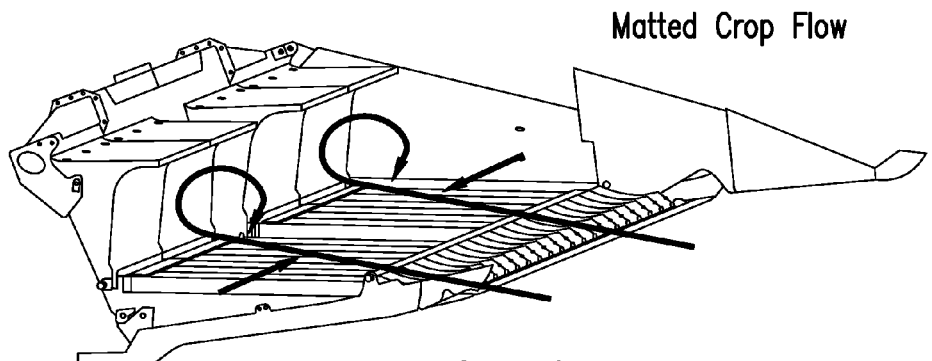
FIG. 1C is a partial perspective view of a harvesting header in accordance with the present invention, demonstrating the handling of matted crop material.

FIGS. 1A through 1C demonstrate 3 different types of crop cutting characteristics which is believed will be ameliorated and enhanced by the operation of the crop harvesting header which incorporates the crop flow assistance device of the present invention. The embodiments shown in these Figures are of a partial harvesting header in accordance with the present invention, in general demonstrating the utility of the concave crop flow assistance surface concept herein.

The first type of crop material which it might be desired to cut would be normal standing crop material such as wheat or other grains. As can be seen in FIG. 1A, the cutting of that material into the header would be accomplished by the engagement of those typically standing stalk-type plants and their falling or deposit by way of a reel or other activity onto the conveyor deck. In the embodiment which is shown in FIG. 1A, crop material which is deposited onto the conveyor deck would then be moved inward by the two transverse belt conveyors towards a central discharge. In this type of crop material, the width of the header as well as the ground speed of the implement overall can be increased by providing the ability to effectively crowd more crop material onto the conveyor deck without having to worry that it will become balled up or that it will slide up over the rear wall across the back of the header.

A second type of crop material which is often cut with these types of reel harvesting headers is bushy crop material such as canola or mustard plants. As can be seen in FIG. 1B, these types of crop material when encountered by the header are standing from a more rigid perspective and may be more top heavy than a grain plant, such that they resemble a bush. A bushy crop will fall into the header and onto the conveyor deck at a higher height and as such it is desirable to in those circumstances as is shown in FIG. 1B, which is a partial perspective view of a header in accordance with the present invention, to curl that crop material downwards where it encounters the rear wall and the crop flow assistance device of the present invention as the draper conveyors move the crop material towards the central discharge.

FIG. 1C is another embodiment of a crop harvesting header which includes the crop flow assistance device of the present invention and which demonstrates the utility of the overall concept for use with matted crop material such as peas, lentils and the like. It can be seen that the matted plant material such as peas or lentils which are lower plants but that are matted together and are typically more likely to tangle or ball, can be deflected in a rolling motion forward as they enter the conveyor deck and then approach the crop flow assistance device. The remainder of the disclosure outline below describes the invention and its behavior in more detail but it was felt that the inclusion of these 3 Figures for the purpose of demonstrating firstly overall the desired crop material feeding behavior of a harvesting header in accordance with the present invention would be useful.

Harvesting Header:

As outlined elsewhere herein there are 2 products which are conceived as the heart of the present invention. The first of these is a harvesting header which includes a crop flow assistance surface defined by at least one crop flow assistance device in accordance with the present invention. The second invention is the crop flow assistance device of the invention itself, separate from a harvesting header, such that it could be retrofit or attached to a preexisting header.

Figure 2:
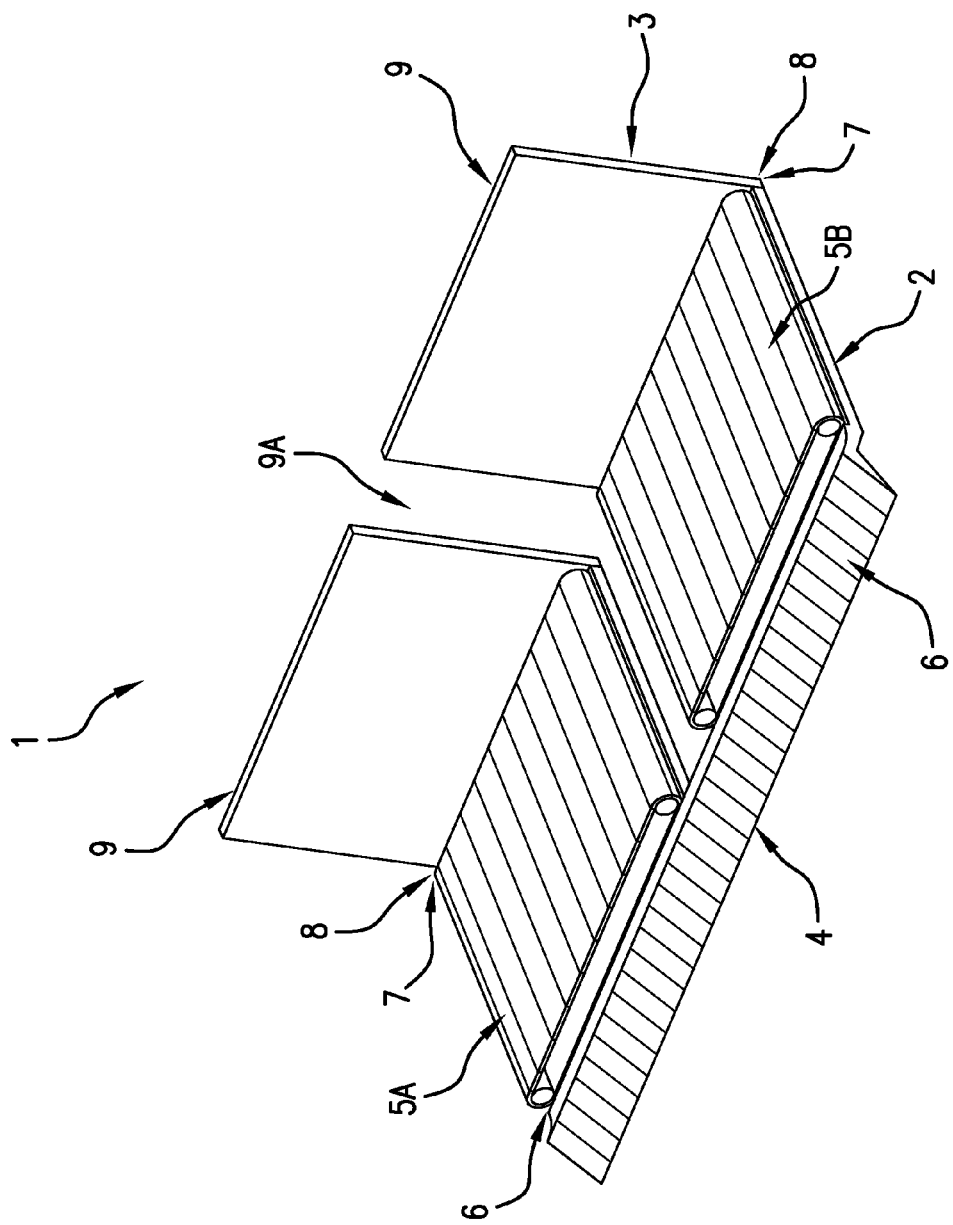
FIG. 2 is a perspective view of a portion of a prior art harvesting header.
Figure 3:
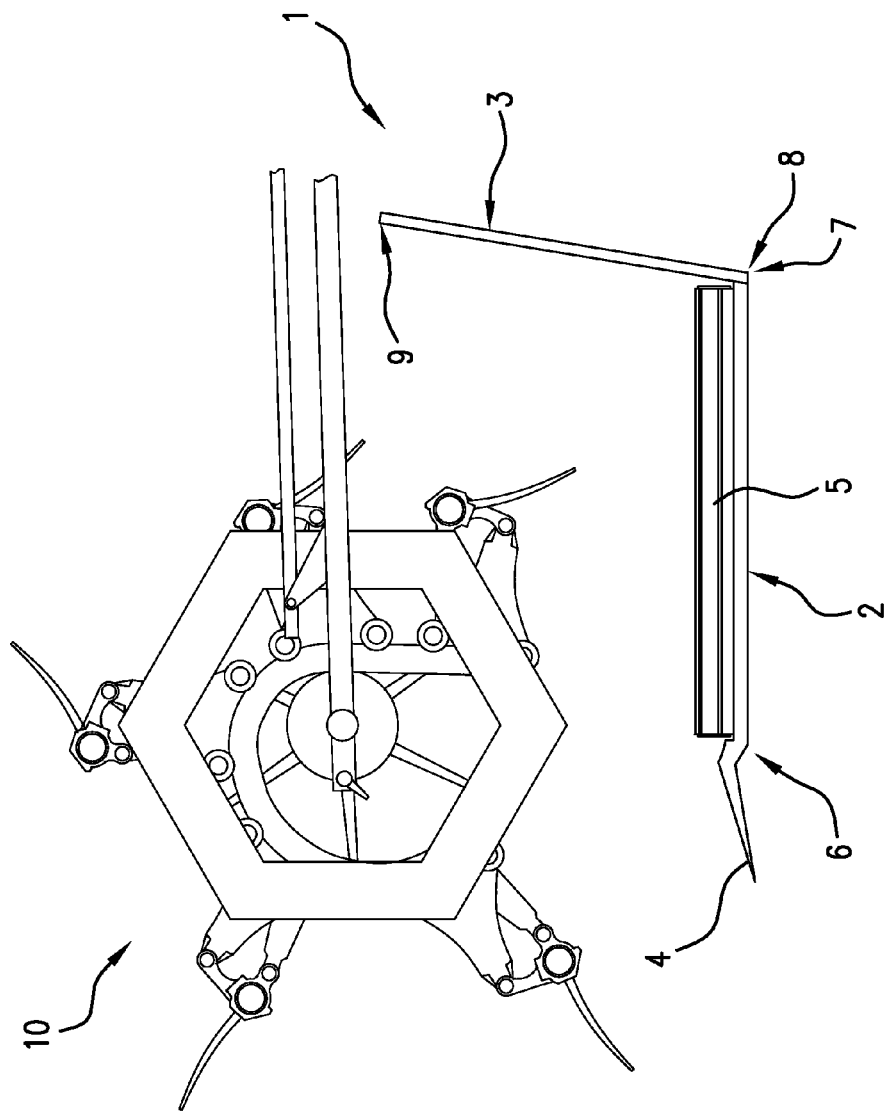
FIG. 3 is a cutaway side view of the prior art harvesting header of FIG. 2.

Referring first to FIGS. 2 and 3 there is shown of a preexisting harvesting header configuration which are used to demonstrate the basic utility of the present invention. There is shown a conveyor deck 2 and a rear wall 3 attached thereto. The conveyor deck 2 has a front edge 6 and a rear edge 7. The rear wall has a bottom edge 8 and a top edge 9. The rear wall 3 is attached along its bottom edge 8 at or near the rearward edge 7 of the conveyor deck 2, with the rear wall 3 extending upwards therefrom. The rear wall 3 might be attached perpendicular to the conveyor deck 2 or may be attached at an angle—either is contemplated within the scope of the present invention—in any event, the joinder of the rear wall 3 and the conveyor deck 2 together creates a cradle within which crop material can move.

Shown along the forward edge 6 of the conveyor deck 2 is a cutting blade 4. The cutting blade 4 will cut crop material which is encountered as the header 1 is driven forward through standing crop. The crop material will then fall rearwards onto the conveyor deck 2 as it is assisted by a reel or other similar device, to assist in drawing the crop material across the cutting surface 4 and up onto the conveyor deck 2. Also shown is a transverse conveyor—in this case 2 transverse conveyors 5A and 5B are shown, each of which when rotated in opposing directions towards the center of the conveyor deck 2 to carry crop material deposited thereon towards the center of the deck and towards the discharge which is shown at 9A. The discharge 9A, either as a direct falling discharge to the ground below the unit where the header 1 is being used to simply cut and create a windrow, or in a case where it is attached to the front of a harvesting machine the discharge 9A may have another central belt which carries crop material up into the discharge 9A for entry into the throat of a harvesting machine or the like.

FIG. 3 shows a cutting reel 10, when mounted rotationally in relation to the remainder of the header 1 will draw crop material across the cutting surface 4 and onto the conveyors 5 on the cutting deck 2. The reel 10 is not shown in FIG. 2 but forms an essential element of most harvesting headers in accordance with the remainder of the present invention.

Figure 4:
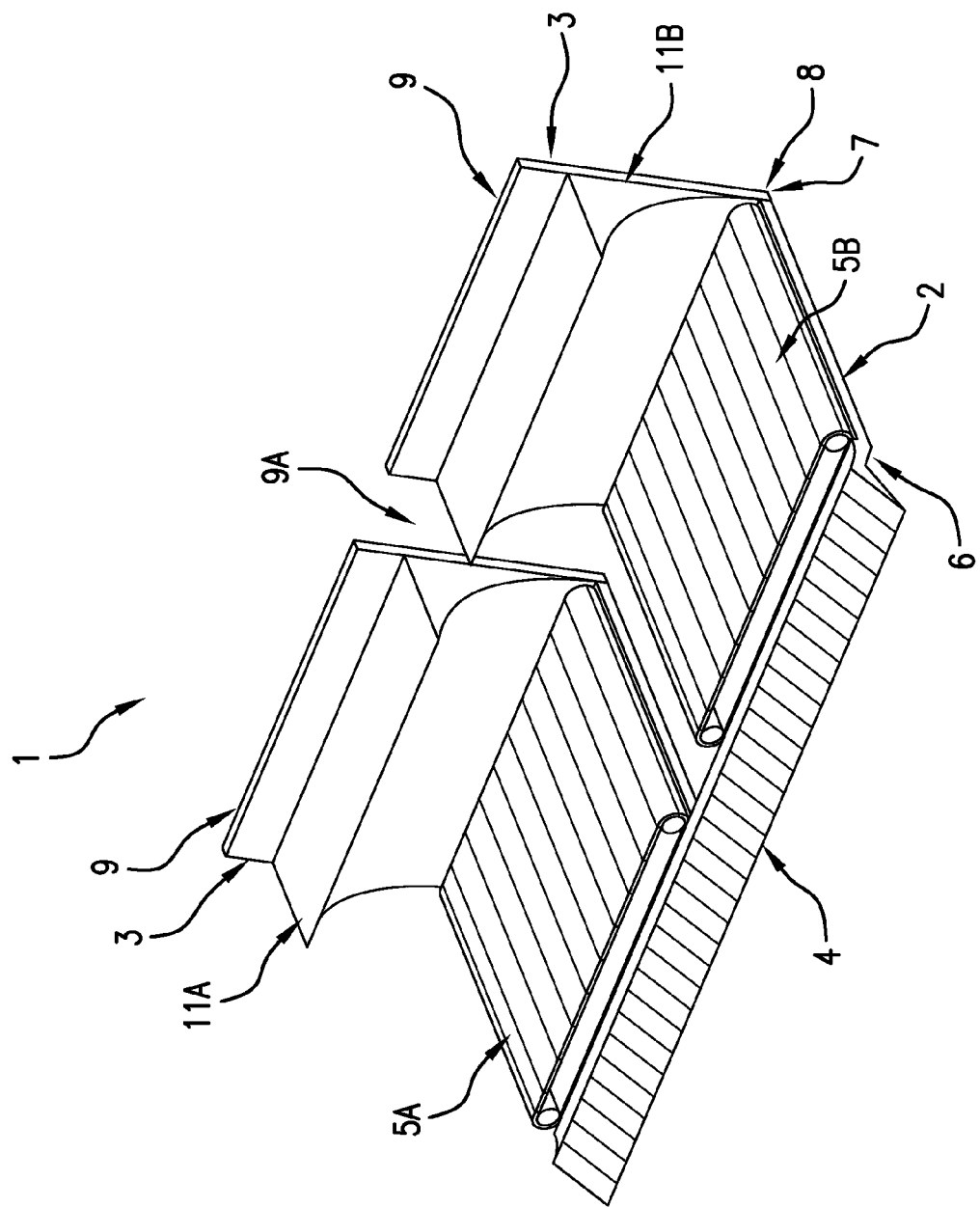
FIG. 4 is a perspective view of one embodiment of a portion of a harvesting header in accordance with the invention.

Referring next to FIG. 4, there is shown the addition of a crop flow assistance device 11 in accordance with the present invention. There are 2 crop flow assistance devices 11A and 11B shown. As can be seen, those 2 crop flow assistance devices 11A and 11B are attached along the rear wall 3 of the header in such a way that they provide an inwardly curved or concave surface onto which crop material can roll when digested into the header and into the crop material transport area, for the purpose of maximizing the efficiency and throughput of the unit with minimal disruption of the crop material itself. It will also be understood that a single crop flow assistance device 11 could be used in the place of the 2 devices 11A and 11B which are shown in this Figure, and there could simply be a manufactured opening in the center of that single unitary crop flow system device 11 to allow for the disgorgement of crop material into the discharge of the header 1. Both such approaches are contemplated within the scope of the present invention.

Figure 4A:
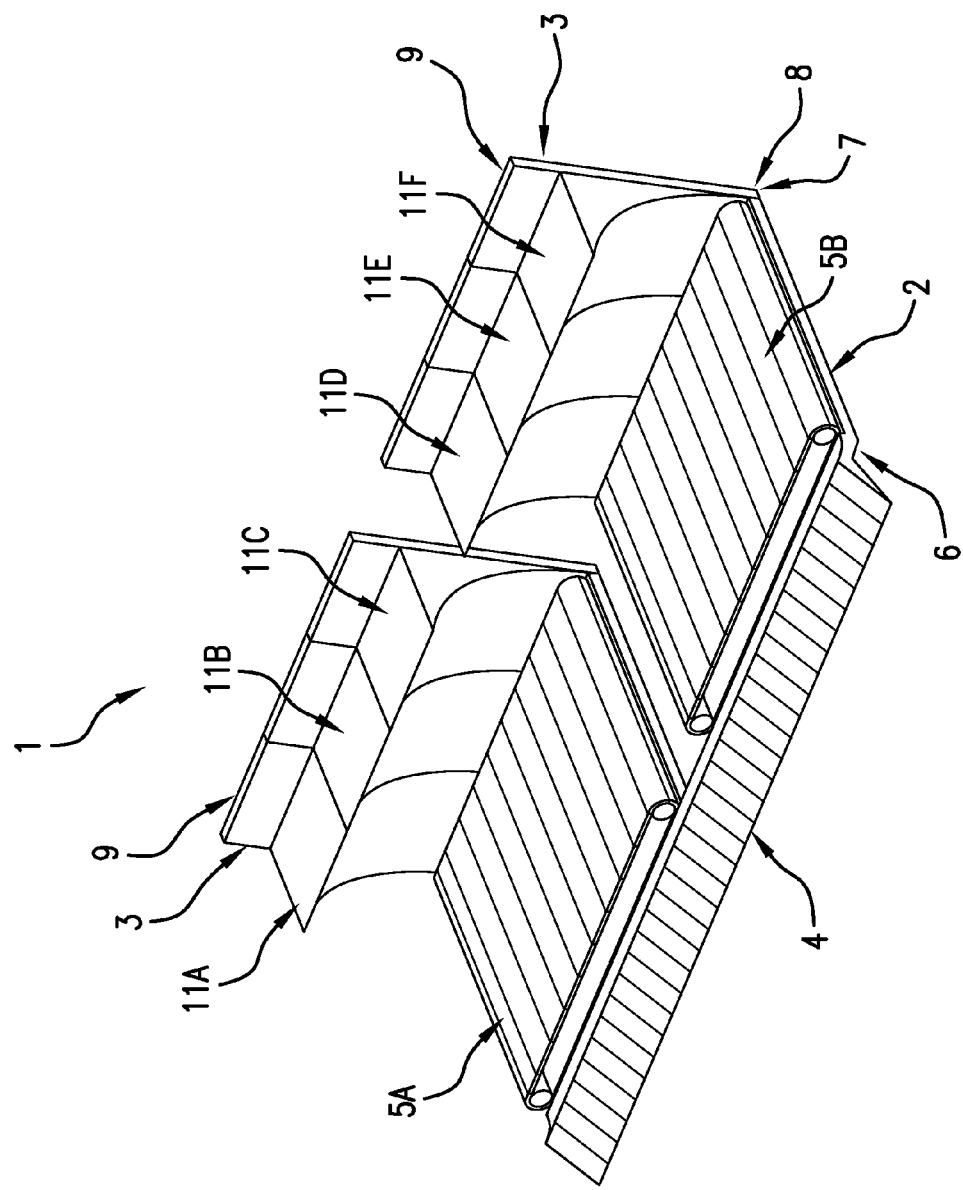
FIG. 4A is a perspective view of an alternate embodiment of a harvesting header in accordance with the present invention, where a plurality of crop flow assistance devise is used to create the crop flow assistance surface.
Figure 5:
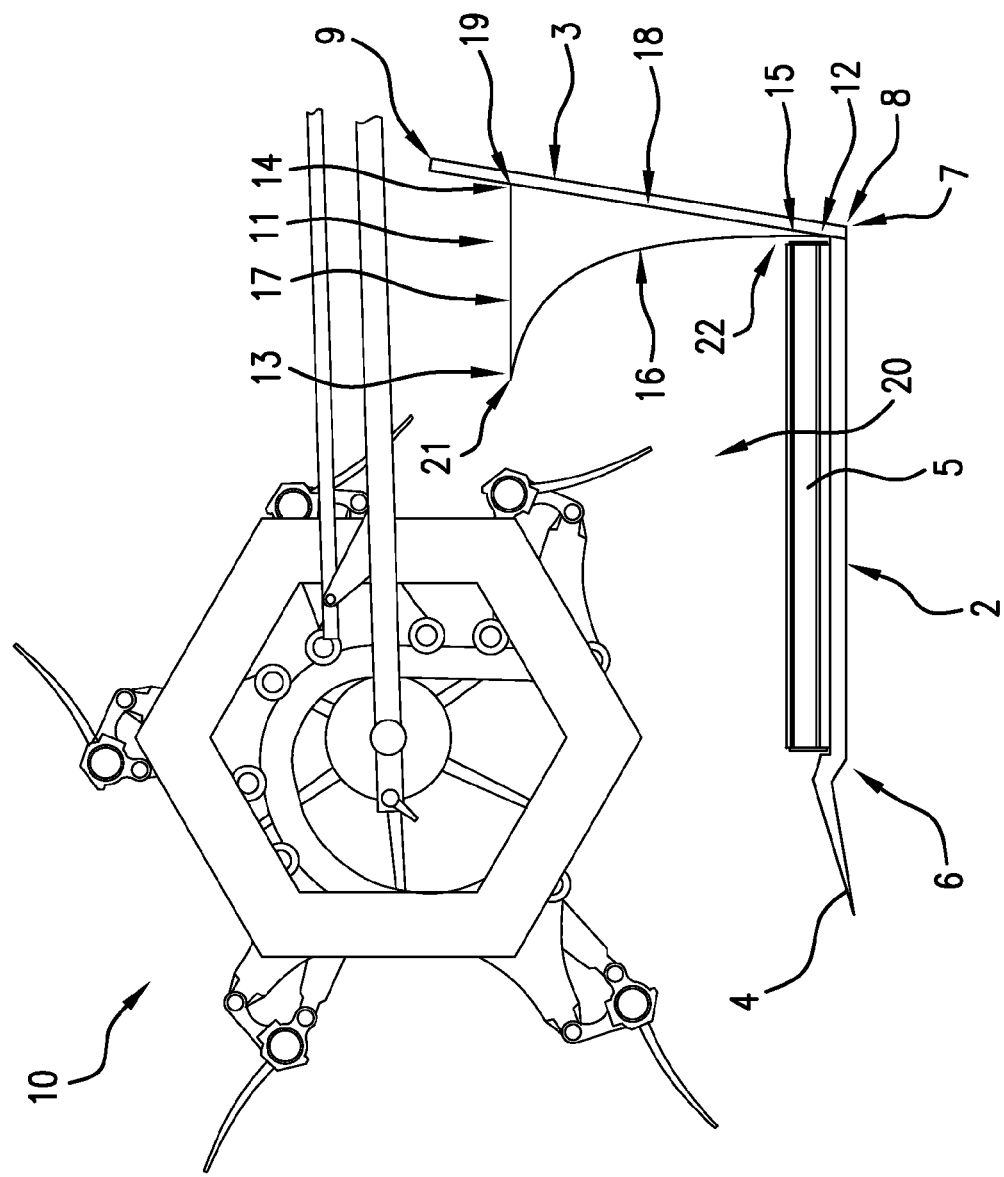
FIG. 5 is a cutaway side view of the embodiment of FIG. 4.

FIG. 4A shows an alternate embodiment of the present invention in which a plurality of crop flow assistance devices 11 is used to define a crop flow assistance surface. This alternate approach and all variations obvious to those skilled in the art are contemplated within the scope of the present invention as well. Referring next to FIG. 5, the side view here is shown to demonstrate the configuration of the crop flow assistance device 11 from a side cutaway.

The crop flow assistance device 11 itself comprises a top body member 17 which has a forward edge 13 and a rearward edge 19. The rearward edge 19 is attached to the rear wall 3 of the header 1 in proximity to the top edge 9 thereof, and the forward edge 13 of the top body member 17 extends into the crop material transport area 20, towards but not engaging the crop reel 10. As is shown, the top body member 17 extends forward from the rear wall 3 approximately parallel to the ground below the header 1, but various angles of protrusion forward from the rear wall 3 by that top body member 17 could be contemplated without departing from the scope of the present invention.

The next element of the crop flow assistance device 11 is a generally concave crop guidance plate 16. The crop guidance plate 16 has a top edge 21 and a bottom edge 22. The top edge 21 of the crop guidance plate 16 is attached along the forward edge 13 of the top body member 17, and the bottom edge 22 of the crop guidance plate 16 is attached to the rear wall 3 of the header 1 in proximity to the top edge of the at least one transverse conveyor 5. The crop flow assistance device 11 will provide a smooth crop flow assistance surface for crop material moving up the rear wall 3 of the header 1, back into the crop material transport area 20 while it is carried across the conveyor deck 2 by the at least one transverse conveyor 5.

The crop guidance plate 16 might have a smooth curvature, or might by virtue of method of manufacture or otherwise have a number of creased folds in it to yield a generally arcuate crop guidance plate 16. Either such approach is contemplated within the scope of the present invention. As well, different arcs or curvatures of the concave crop guidance plate 16 could be contemplated, all of which are being contemplated within the scope of the present invention.

Also shown in the crop flow assistance device 11 of FIG. 5 is a rear surface 18 attached to the remainder of the device, extending between the rear edge 14 of the top body member 17 and the bottom edge 22 of the crop guidance plate 16. That rear face 18 provides a generally planar surface for attachment to or alongside the rear wall 3 of the header. As is outlined elsewhere herein, it is explicitly contemplated that the crop flow assistance device 11 might have this rear surface 18 and some other embodiments this aspect of the component may be omitted. It would likely provide additional structural strength to the crop flow assistance device 11 and on that basis it is conceived that in many if not most circumstances it may be desired to include this type of added support.

The crop flow assistance device 11 of the present invention would extend across substantially all of the top edge 9 of the rear wall 3 of the header with the exception of any discharge area. This might be accomplished either by using a single crop flow assistance device 11 which was manufactured to the entire desired length, being the total width of the conveyor deck, or it is also contemplated that multiple smaller units could be manufactured for side-by-side installation in a modular approach, both to allow for the installation of a crop flow assistance device 11 in accordance with the present invention on various widths of preexisting header units, as well as to allow for in certain circumstances the use of crop flow assistance device 11 sections which had varying interior shapes or curvatures dependent upon their placement in relation to the center of the conveyor deck 2. It may be desired to use a plurality of crop flow assistance devices 11 which were manufactured in this way for abutment next to each other or overlapping edges, which in the sections of the crop flow assistance device 11 which were attached near the extreme ends of the conveyor deck to a larger interior curvature face 16 was included and the interior curvature of the sections of the crop flow assistance device 11 was altered as it approached the center of the discharge to effectively provide a graduated stepping curvature profile which would gain help in guiding the crop material towards the discharge. This is shown in FIG. 4A. Both such approaches are contemplated within the scope of the present invention, namely the use of either a single crop flow assistance device 11, or the assembly and attachment of a modular crop flow assistance device 11 using multiple sections of crop flow assistance device 11 in accordance with the remainder of the present invention.

In certain cases, the conveyor deck 2 might consist of 2 halves, where 2 central discharging transverse conveyor belts 5 were used, and in that circumstance where there were 2 conveyor decks bearing their own draper or other conveyor devices, the length of each of those decks may be the length that is desired for the crop flow assistance device 11. Two crop flow assistance devices 11 in accordance with the present invention might be used in that circumstance. In the case of the use of crop flow assistance devices 11 coinciding with two halves of a conveyor deck or two conveyor decks 2 converging on a central belt in a central discharge, it may be desired to add a flange or a connector plate between the top plate 17 of the two respective crop flow assistance device 11 sections, and the addition of such a flange or a cover or on top of the central discharge opening is also contemplated and understood to be within the scope of the present invention.

Crop Flow Assistance Device:

In addition to a harvesting header which includes a crop flow assistance surface which is created by the use of at least one crop flow assistance device as outlined herein. There are 2 different types of crop flow assistance devices 11 demonstrated herein.

Figure 6:
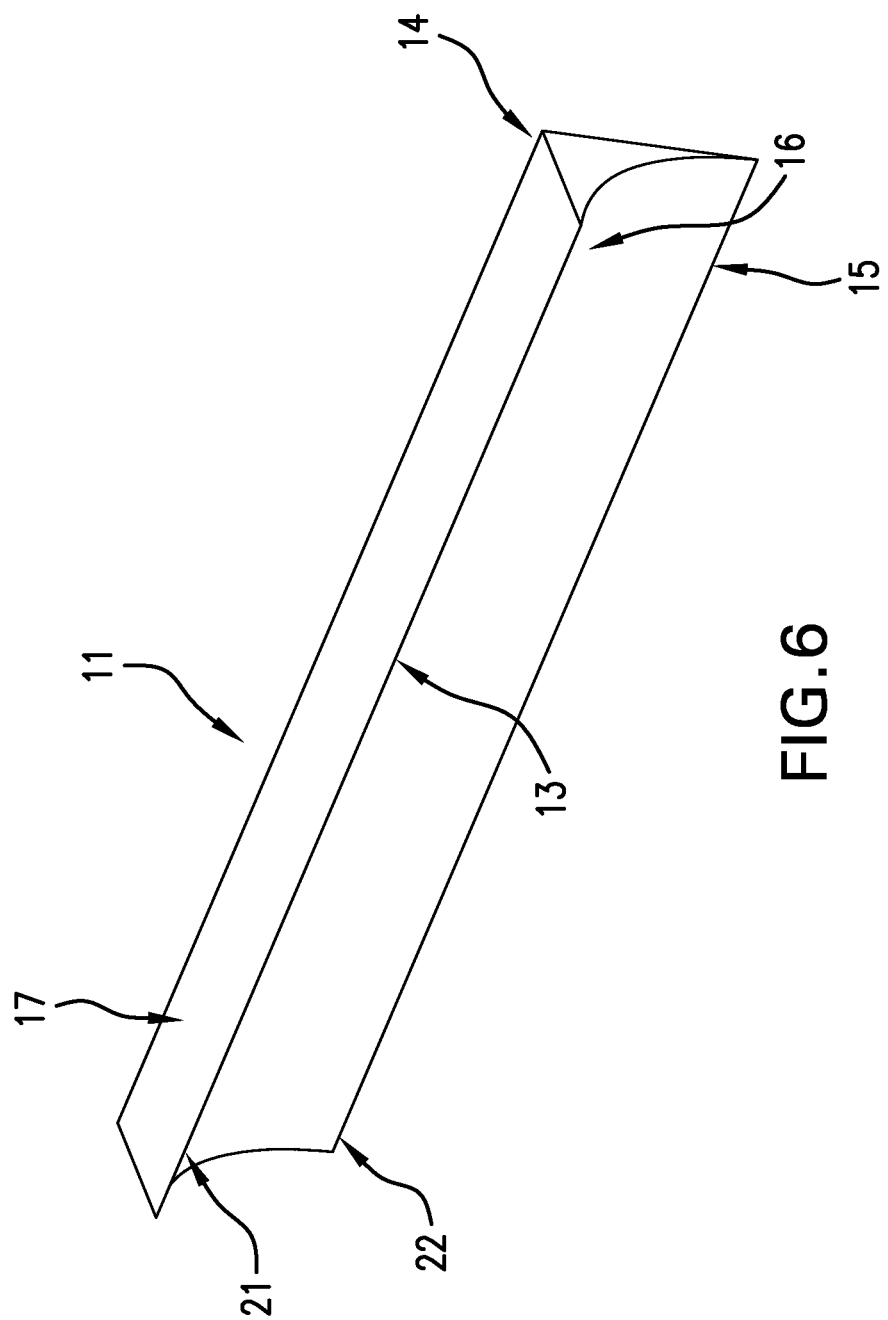
FIG. 6 is a perspective view of one embodiment of a crop flow assistance device in accordance with the present invention.
Figure 7:
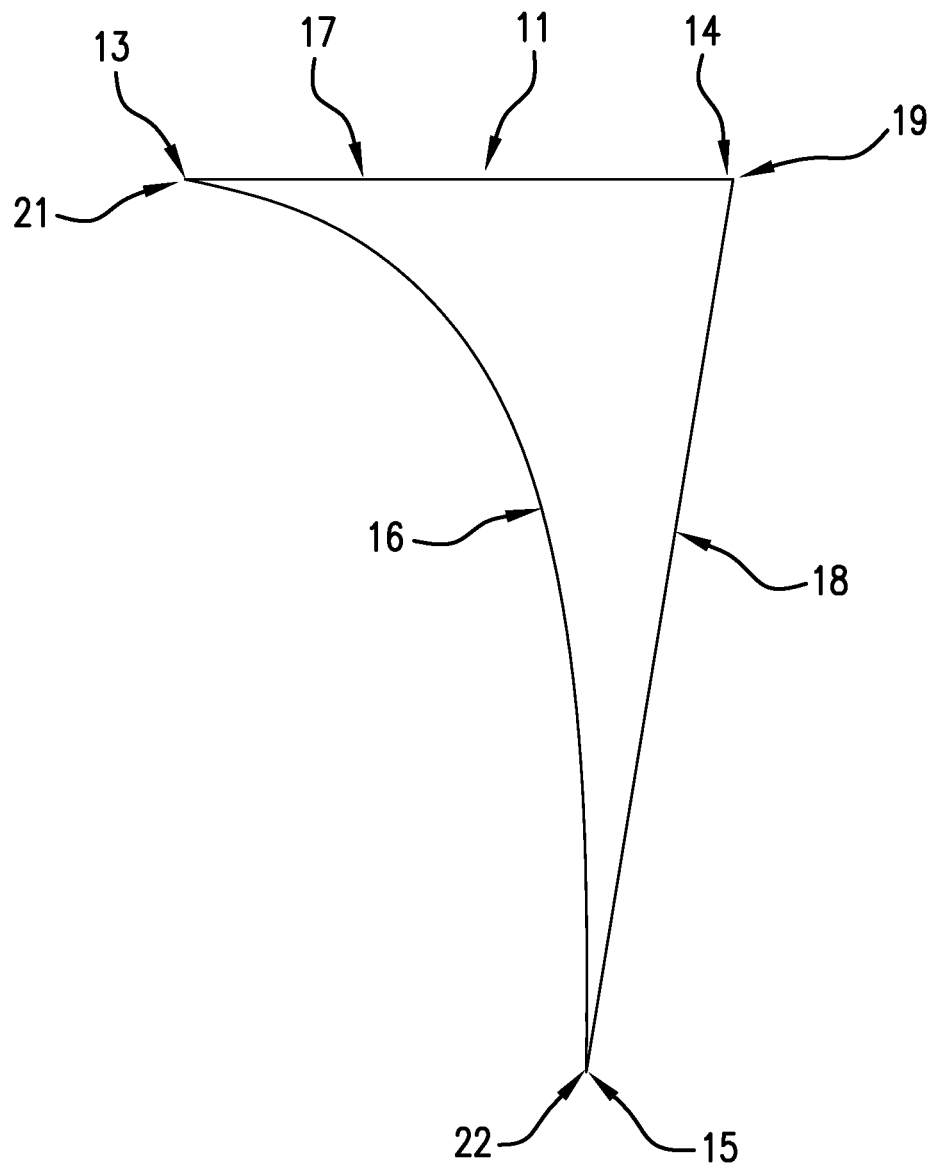
FIG. 7 is a cutaway side view of the embodiment of FIG. 6.

Referring first to FIGS. 6 and 7 there is shown a first embodiment of a crop flow assistance device 11 in accordance with the present invention. The crop flow assistance device 11 which is shown in these Figures is a unitary crop flow assistance device which is of sufficient length to cover a longer portion of the rear wall of a harvesting header, such as the entire difference from one extreme end to the central discharge or even in some cases dependent upon the configuration of the remainder of the device and the discharge extending all the way across the entirety of the conveyor deck and the rear wall.

The crop flow assistance device 11 comprises a top body member 17, which has a forward edge 13 and rearward edge 14. The rearward edge 14 thereof is intended to be attachable to the rear wall of a header, in proximity to the top edge thereof or defining the top edge of the crop material transport area. The forward edge 13 of the top body member 17 extends forward from the rear wall when attached, into and defining the top of the crop material transport area.

The next element of the crop flow assistance device 11 shown in FIG. 6 is the crop guidance plate 16, which is approximately concave and has a top edge 21 and a bottom edge 22. The top edge 21 of the crop guidance plate 16 is attached along the forward edge 13 of the top body member 17-or in the case of a unitary manufacture might also be a bent plate which was bent into forming the approximately concave crop guidance plate 16 extending downwards into the crop material transport area from the front edge 13 of the top plate 17. The bottom edge 22 of the crop guidance plate 16 is attachable to the rear wall of the header in proximity to the top surface of the at least one transverse conveyor. When reviewed in comparison or alongside the remainder of the Figures in this application it will be seen how the embodiment of a crop flow assistance device 11 shown in this Figure could be retrofitted to a prior harvesting header to provide the efficiency and effect of the present invention in such a context. The crop flow assistance device 11 which is shown in FIG. 6 provides a smooth crop flow assistance surface for crop material which might otherwise be moving up the rear wall of the header, back into the crop material transport area where it is carried across the conveyor deck by the at least one transverse conveyor. Referring to FIG. 7 there is shown a cutaway side view of the embodiment of FIG. 6, which is intended to show the method of construction of the crop flow assistance device 11 therein. Also shown in the embodiment of FIGS. 6 and 7 is a rear facing wall 18, which could be used to strengthen the crop flow assistance device 11 and provide a more complete engaging surface to the rear wall of the header.

Figure 8:
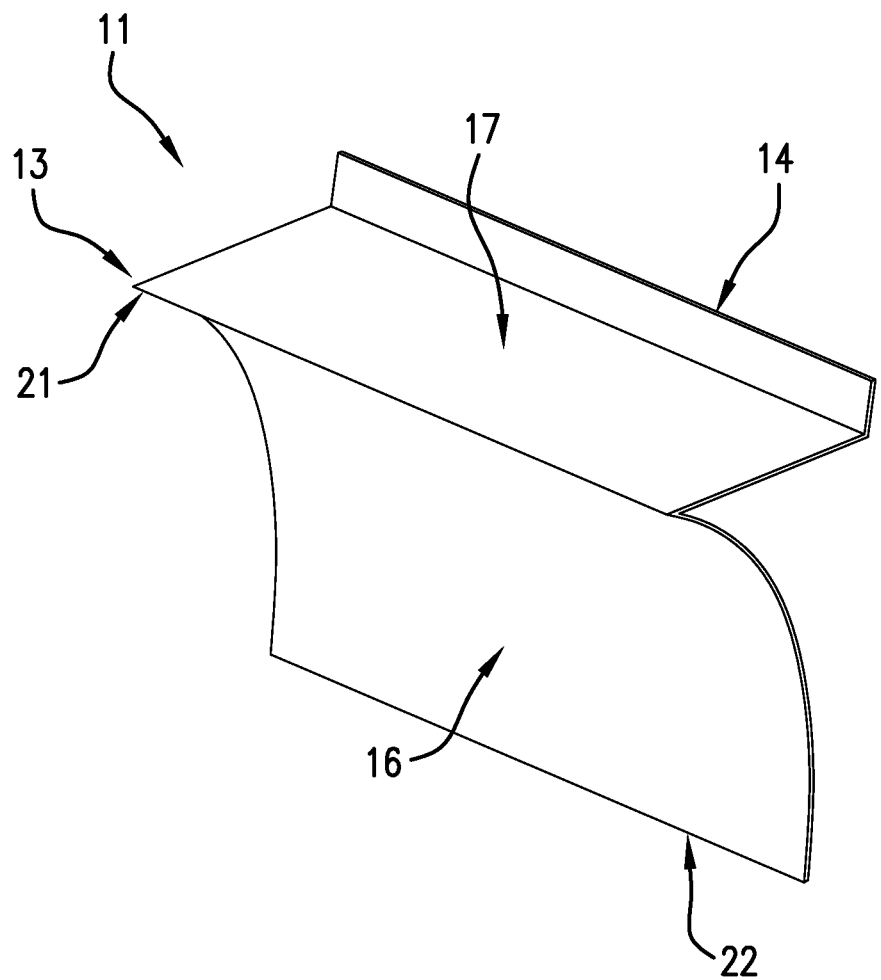
FIG. 8 is perspective view of an alternate embodiment of a crop flow assistance device in accordance with the present invention.
Figure 9:
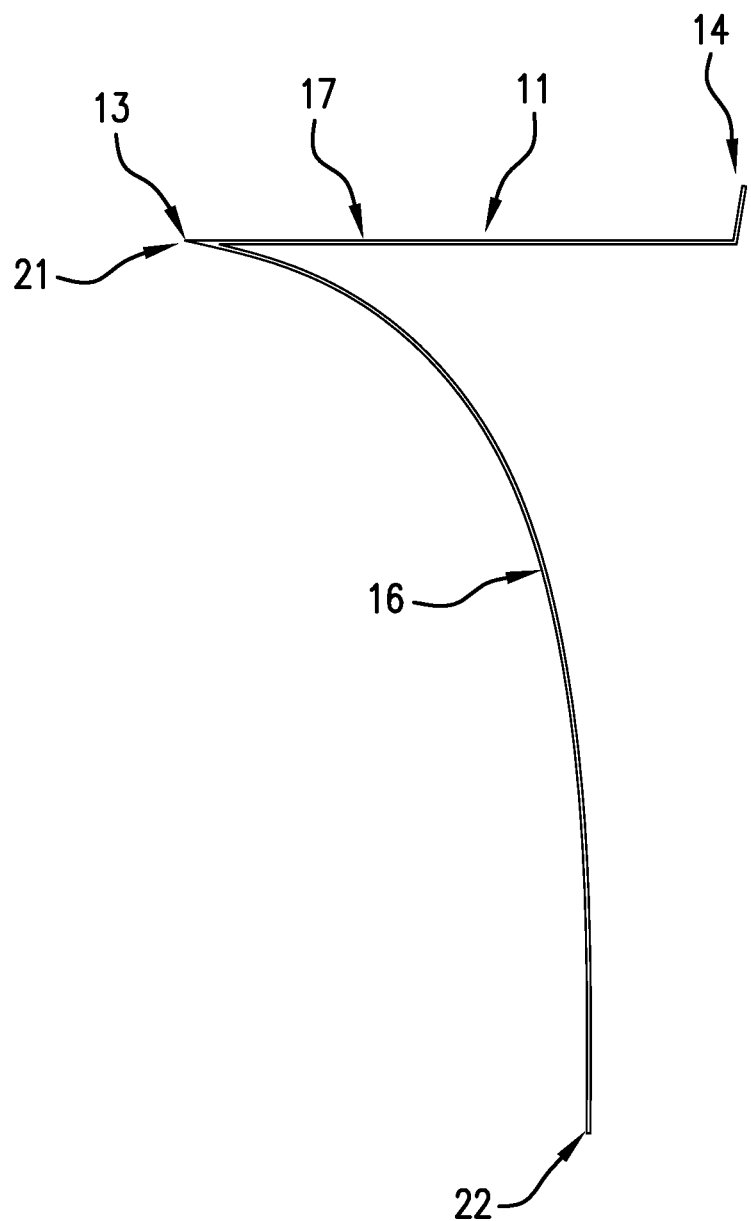
FIG. 9 is a cutaway side view of the embodiment of FIG. 8.

The next embodiment of our crop flow assistance device 11 which is shown herein is the embodiment of FIGS. 8 and 9, which is a smaller crop flow assistance device 11 which could be used in modular configuration as outlined elsewhere herein. The embodiment of FIGS. 8 and 9 also, for the sake of demonstration of an alternate construction method, do not include the rear facing wall 18 which is shown in FIG. 7.

Referring to the embodiment of FIG. 8 there is shown a top body member 17 which has a forward edge 13 and a rearward edge 14. The rearward edge is attachable to the rear wall of a harvesting header at a point defining the top of a crop material transport area, proximate to the top edge of the rear wall of the header. Extending downwards from the forward edge 13 of the top body member 17 is a crop guidance plate 16 which is approximately concave. The crop guidance plate has a top edge 21 which is attachable along the forward edge 13 of the top body member 17, and extends downwards to a bottom edge 22 which is attachable to the rear wall of the header in proximity to the top surface of the at least one transverse conveyor. A plurality of the crop flow assistance devices 11 such as shown in perspective view in FIG. 8 and side view in FIG. 9 could be used when mounted adjacent to each other to in totality provide a crop flow assistance surface made up of the crop flow assistance or concave face 16 of each of the crop flow assistance devices 11. Again as outlined above, this particular embodiment shown in FIGS. 8 and 9 does not include the rear facing wall, which is shown in this fashion to demonstrate another Mounting:

The mounting of the crop flow assistance devices 11 of the present invention onto the remainder of a harvesting header 1 could be done in a number of different ways. In OEM installation, the crop flow assistance device No. 11 should be welded into place or otherwise permanently attached to the rear wall 3. Alternatively, if it was desired either for maintenance or other removal purposes, the crop flow assistance devices 11 can also be bolted or attached with other hardware onto the rear wall 3 of a harvesting header. Various types of mounting hardware and mounting approaches can be conceived by those sealed in the arch and all are contemplated within the scope of the present invention.

Mounting hardware might be to a degree dictated by the type of harvesting header 1 on to which the crop flow assistance devices 11 of the present invention was going to be installed and a retro fitted installation—for example, a retro fit of a crop flow assistance devices 11 in accordance with the remainder of the present invention could be manufactured with the appropriate mounting points and hardware to engage certain mounting points on a pre-existing header type of a certain manufacturer. Alternatively those crop flow assistance devices 11 could also be purpose fit and attached to a harvesting header 1 at time of mounting thereon.

Modular Versus Unitary Device:

As outlined above, the crop flow assistance devices 11 of the present invention can either be unitary or modular in its assembly and nature. In the case of a unitary crop flow assistance devices 11 such as shown in FIG. 6, a single unitary crop flow assistance device similar to 11 could be manufactured which was of the desired length to extend from one extreme end of the conveyor deck 2 on a harvesting header 1 to which it was to be attached, either to the center discharge or to the extreme opposite end of the conveyor deck 2. In the case of this type of a unitary crop flow assistance device, this might be most desirable if it was manufactured for only in installation on the new harvesting header. However both in order to accommodate particular installation configurations on harvesting headers of different manufacturers as well as for the purpose of installation of the crop flow assistance devices 11 to the present invention on harvesting headers of various widths, it is contemplated that in other circumstances of modular completed crop flow assistance devices 11 might be assembled.

A plurality of crop flow assistance devices 11 could be assembled as a modular unit onto a harvesting header by mounting them adjacent to each other along the rear wall 3 of a header 1. By mounting a plurality of crop flow assistance devices 11 each manufacturer in accordance with the remainder of the present invention adjacent to each other along the rear wall of the harvesting header, a completed interior crop material surface could be created for the rolling deflection of crop material back into the crop material transporter as it was moved by the transfer conveyor or conveyors to the discharge of the header. Use of the plurality of smaller crop flow assistance devices 11 in this fashion for a modular configuration and installation, which could be mounted by hardware or welding onto the rear wall of the harvesting header to the completed desire length extending from the extreme mans of the conveyor deck towards the discharge is also contemplated.

The modular approach to assembly of a completed unit, using a plurality of crop flow assistance devices 11 in accordance with the remainder of the present invention would allow for the manufacturer of many different completed crop flow assistance devices based upon a smaller set of modular sections. Manufacturer of different sized modular sections which could be mixed and matched to create installation kits for a crop flow assistance devices 11 and surface in accordance with the present invention for use on harvesting headers of varying widths is explicitly contemplated within the scope of the present invention. Thus a completed crop flow assistance devices 11 in totality complies as a plurality of smaller crop flow assistance devices 11 each in accordance with the present invention are also contemplated within the scope hereof.

One of the other reasons that modular approach to the assembly and installation of the crop flow assistance devices 11 is contemplated is that in certain cases it may be desired to use individual crop flow assistance devices 11 as sections of a larger modular installation which each has slightly different interior curvatures to them, so that effectively an inward wave or bowl configuration could be created to effectively further shape the movement of the crop material along the conveyor table of a header towards the discharge area. By providing an inwardly curved overall crop material surface within the assembled crop flow assistance devices 11, a copying motion or the like could be effectively asserted upon the crop material in addition to the rolling motion as the material was rolled up the rear wall and the crop flow surface. This is another approach which is explicitly contemplated within the scope of the present invention as described herein.

Rear Face on the Device:

As outlined above, in certain circumstances it is contemplated that the crop flow assistance devices 11 of the present invention could be manufactured with or without a rear-face thereon. In the embodiment shown in FIG. 5 for example there is a rear face 18 attached to the remainder of the crop flow assistance devices 11 which would provide additional strength for the devices 11. In other embodiments showing herein, the rear face 18 might not be used—all such perks are contemplated within the scope of the present invention. Addition of a rear face such as shown at 18 in FIG. 5 would also provide additional ability to modify the hardware attachment of the crop flow assistance devices 11 to different types of harvesting headers 1.

Retrofit Kit:

It is explicitly contemplated that using a modular approach such as is outlined above, another aspect of the present invention would be to provide a retro fit kit which would allow for the assembly of a crop flow assistance devices 11 and in accordance with the present invention on a pre-existing harvesting header 1. The retro fit kit would comprise a plurality of crop flow assistance devices 11 which when assembled together adjacent to each other along the rear wall of the header 1 would in totality provide a completed crop flow assistance surface. As outlined elsewhere above, the crop flow assistance device which might be used in this type of a modular implementation might actually also be manufactured with an overlapping fledge or edge such that they could be mated together in their assembly of attachment to the header. As is outlined above, in certain embodiments of a retro fit kit in accordance with the present invention, some of the crop flow assistance devices 11 might have different anterior curvatures or profiles such that when attached they could provide a graduated or stepping curvature towards the discharge.

In addition to a plurality of crop flow assistance devices 11, the kit could also include the necessary hardware for a hardware base attachment of those devices 11 to a header 1. Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A harvesting header comprising
at least one draper belt system comprising a conveyor belt having a generally planar conveying surface operable to carry cut crop material in a conveying direction generally transverse to a direction of travel of the harvesting header in operation to a header discharge;
a crop reel rotatable about a crop reel axis, said axis generally parallel with the conveying direction, said crop reel operable to, when rotated in operation, draw crop material onto the conveying surface of the conveying surface;
at least one crop flow assistance device having a substantially smooth crop flow assistance surface, said crop flow assistance surface including at least a rearward portion that is located adjacent to and rearward of a rearward transverse edge of the conveying surface of the conveyor belt, and said crop flow assistance surface having a smooth concave curved portion that extends into a volume directly above the conveying surface, said volume defined in part by a lower planar boundary aligned with the conveying surface and said volume extending upwards from the said conveying surface, said volume also defined in part by a forward transverse planar boundary aligned with a forward transverse edge of said conveying surface and extending upwards from and in a direction perpendicular to said conveying surface, and said volume also defined in part by a rearward transverse planar boundary aligned with a rearward transverse edge of said conveying surface and extending upwards from and in a direction perpendicular to the conveying surface, wherein the curved portion of the crop flow assistance surface extends substantially into the volume, said crop flow assistance surface operable to roll crop material onto the conveying surface while the crop material is carried to the header discharge in operation.

2. The harvesting header of claim 1 wherein the at least one draper belt system comprises first and second draper belt systems and a header discharge is located between the first and second draper belt systems generally at a center of the header.

3. The harvesting header of claim 1 wherein the crop flow assistance surface extends substantially into the volume such that the crop flow assistance surface overhangs at least ¼ of the conveying surface.

4. The harvesting header of claim 1 further comprising a cutter disposed proximate the forward transverse edge of the conveyor surface and operable to cut the crop material.

* * * * *